United States Patent

Pouille et al.

[11] Patent Number: 5,814,263
[45] Date of Patent: Sep. 29, 1998

[54] TIRE MOLD WITH CONTROLLED INTERNAL PRESSURE

[75] Inventors: Guy Pouille, Clermont-Ferrand; Bernard Ravel, Nohanent, both of France

[73] Assignee: Compagnie Generale des Etablissements Michelin-Michelin & Cie, France

[21] Appl. No.: 716,000

[22] Filed: Sep. 19, 1996

[30] Foreign Application Priority Data

Sep. 26, 1995 [FR] France .................................. 95 11364

[51] Int. Cl.⁶ .................................................. B29C 35/00
[52] U.S. Cl. ............................ 264/326; 264/315; 425/39; 425/47
[58] Field of Search ..................... 264/315, 326, 264/36; 425/47, 17, 19, 39

[56] References Cited

U.S. PATENT DOCUMENTS

| | | | |
|---|---|---|---|
| 3,682,576 | 8/1972 | Gross | 425/47 |
| 3,901,632 | 8/1975 | Prosdocimi | 425/47 |
| 3,922,122 | 11/1975 | Bottasso et al. | |
| 3,989,791 | 11/1976 | Tippin | 425/47 |
| 4,289,463 | 9/1981 | Le Moullac | 425/47 |
| 4,931,004 | 6/1990 | Fogorasi et al. | |
| 5,269,669 | 12/1993 | Ladouce | 425/47 |
| 5,382,402 | 1/1995 | Espie et al. | 264/326 |
| 5,585,064 | 12/1996 | Moris-Herbeuval et al. | 264/326 |

FOREIGN PATENT DOCUMENTS

| | | |
|---|---|---|
| 0320588 | 6/1989 | European Pat. Off. . |
| 2306070 | 10/1976 | France . |
| 4301348 | 7/1994 | Germany . |

*Primary Examiner*—Mathieu D. Vargot
*Attorney, Agent, or Firm*—Alan A. Csontos; Robert R. Reed

[57] ABSTRACT

Mold for a tire or for an annular tread member of a tire, including a multiplicity of sectors moving radially and closed by the axial displacement of a crown coming to act upon the frusto-conical sector seats, and of an annular element, midway between the crown and the sector seats, intended to permit axial retraction of the crown when the internal pressure in the cavity of the mold exceeds a given threshold of pressure.

12 Claims, 2 Drawing Sheets

5,814,263

TIRE MOLD WITH CONTROLLED INTERNAL PRESSURE

BACKGROUND OF THE INVENTION

The invention concerns a mold for manufacture of tires or annular tread members for retreading tires.

Such molds have very similar designs. The principal difference is the absence of lateral shells intended to mold the sidewalls of the tires. On the other hand, we find in both applications a peripheral crown of sectors to mold the tread and a membrane or a rigid hub to mold the interior sole of the tread member.

The use of a rigid hub is described, for example, in application EP 242 840. The totally rigid design of this mold for tires offers numerous advantages regarding the quality of the molded tire because the geometric shapes obtained are of high quality (excellent circularity, in any transversal position). However, molding at an imposed volume requires that very close tolerances be observed on the volume of the green tire. On the other hand, expansion of the rubber due to the increase in temperature can cause, in the totally rigid mold, very high increases in pressure likely to damage certain parts of the mold.

The increase in internal pressure due to the expansion of the rubber can also be harmful at the time of molding the internal cavity of the mold with a membrane. This is particularly the case when the volumes of rubber are very large as for earthmover or agricultural tires. The expansion of the rubber of the tread member can cause the pressure to exceed the molding pressure of the membrane; the plies of the crown block of the tire are then put in compression and damages such as dented wear can result.

SUMMARY OF THE INVENTION

The objective of the invention is therefore to be able simply to control the increase in pressure in the internal cavity of the mold.

The mold of the present invention allows for this objective to be achieved. It can prove useful, whether the molding is done with a membrane or on a rigid hub.

The mold for a tire or for an annular tread member of a tire according to the invention is comprised of a multiplicity of sectors moving radially for molding the exterior of the tread member, the closing of said sectors being provided by the axial displacement of a crown coming to act on the frusto-conical seats of said sectors placed radially on the exterior, as well as, to allow the retraction of the sectors from their closing position in the mold, at least one annular element, positioned within a recess in said crown as shown in FIG. 1, which is comprised of a first support surface, frusto-conical, radially interior, intended to come to be applied at the closing of the mold against the seats of the sectors with a wedging engagement and a second support surface, frusto-conical, radially exterior, intended to hold the support of a corresponding surface of the crown with a non-wedging engagement, said crown being supported with a controlled axial force.

According to a preferred mode of realization, the annular element is also comprised of a third support surface intended to fit against a corresponding surface of the crown to block the related axial displacements between the annular element and the crown at the time of the closing of the mold.

The annular element placed radially exterior relative to the sector seats opposes their retraction through its own resistance to the circumferential expansion as well as through the bracing of the crown against the second support surface. But, beyond a given value of internal pressure in the cavity of the mold, since the fit between the second support surface of the annular element and the corresponding surface of the crown is non-wedging, the forces of expansion experienced by the annular element will cause the axial retraction of the crown accompanied by a circumferential expansion of the annular element and a radial retraction of the sectors.

The level of pressure from which an axial retraction of the crown is obtained is controlled by the level of axial force applied on the crown.

Preferentially, the mold according to the invention is such that the molding of the radially interior sole of the tire or of the annular tread member for a tire is done on a rigid hub.

The invention also concerns a procedure or process for manufacture of a tire or a tire tread member, such that one uses a mold comprised of an annular element, midway between the crown and the sectors, to permit the retraction of the sectors from their closing position when the internal pressure in the cavity of the mold exceeds a given value.

BRIEF DESCRIPTION OF THE DRAWINGS

The following figures illustrate a method of realization of the invention and permit understanding all of the advantages.

DETAILED DESCRIPTION OF THE PREFERRED EMBODIMENTS

Figure 1:
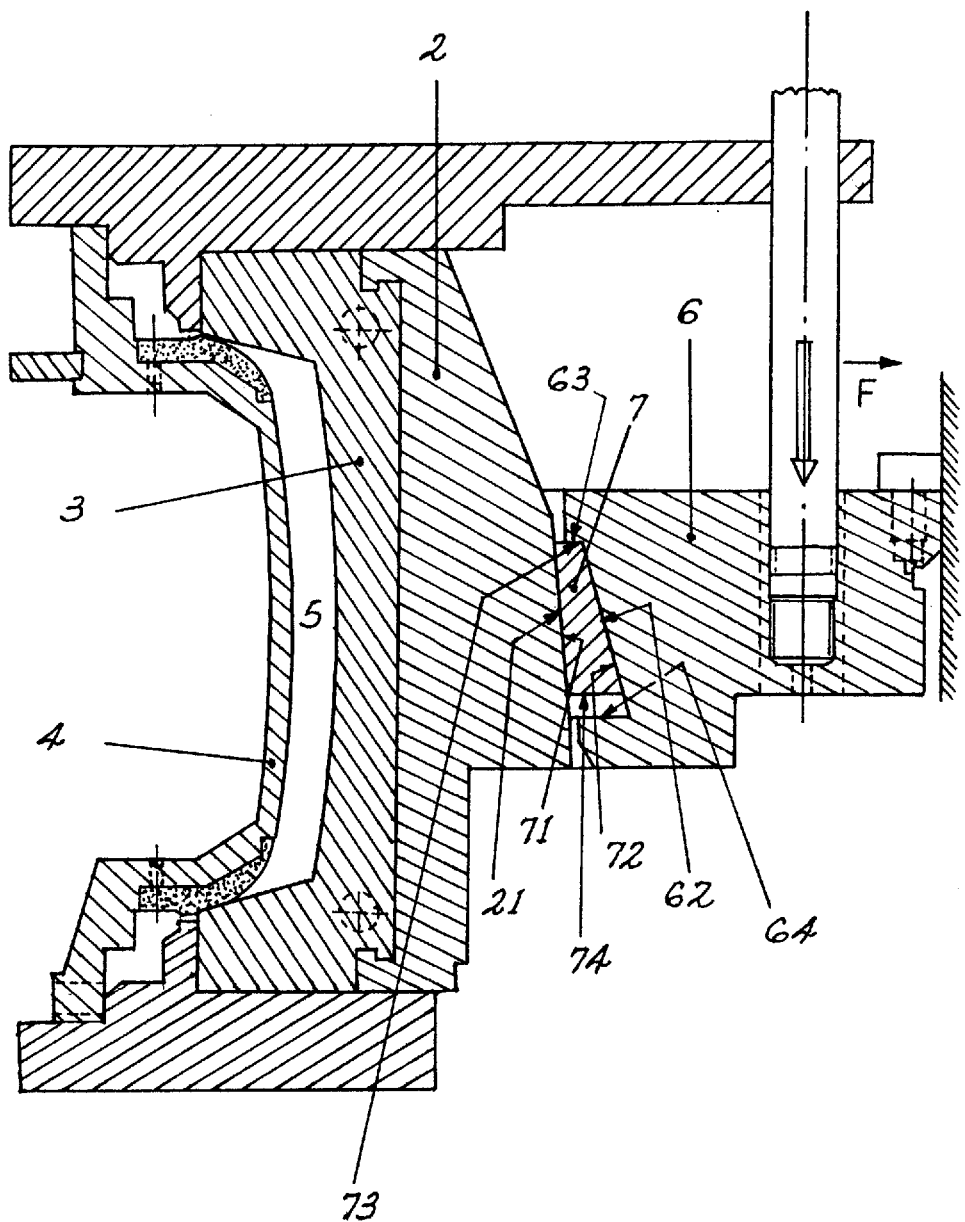
FIG. 1 is a meridian section of a mold according to the invention.

FIG. 1 shows a schematic meridian section of a mold 1 for an annular tread member according to the invention.

This mold is comprised of sectors 2 with elements 3 for molding the radially exterior surface of the annular tread member, and a rigid metallic hub 4. The hub unit 4 and the molding elements 3 define the internal cavity 5 of the mold 1.

A crown 6 radially exterior relative to the sectors 2 and with axial displacement assures the closing of the sectors 2 by coming to engage a frusto-conical seat 21 radially on the exterior of the sectors 2 through an annular element 7. This annular element 7 engages the sectors 2 of the radially internal side and an internal part of the crown 6 of the radially exterior side. Displacement of the crown 6 is done, for example, by a jack (not shown) with an adjustable force of application F.

The annular element 7 has a cross-section which is generally trapezoidal. It is comprised of:

a first frusto-conical support surface 71, radially interior, intended to engage the corresponding frusto-conical seats 21 of the sector 2; the angle of inclination of these frusto-conical seats is such that the fit is wedging, for example, about 5 to 6 degrees;

a second frusto-conical support surface 72, radially exterior, intended to come to engage a corresponding frusto-conical surface 62 of the crown 6; the angle of inclination of this second frusto-conical support surface 72 and the corresponding surface 62 is such that the fit between these two surfaces is not wedging, for example, greater than 16 degrees;

a third support surface 73, basically perpendicular to the axis of the mold, intended to fit to a corresponding surface 63 of the crown 6; these two surfaces 73 and 63 limit the related axial displacements between the annular element 7 and the crown 6; and a fourth support surface 74, basically perpendicular to the axis of the mold, on which a corresponding surface 64 of the crown 6 comes to rest to assure the retraction of the annular element 7 upon opening of the mold 1.

The operation of the mold is as follows. After having placed the non-vulcanized annular tread member in the cavity 5, the mold 1 is closed by a progressive forward axial displacement of the crown 6 due to the progressive increase of the force of closing F. The annular element 7 is then resting on the crown 6 at its second 72 and third 73 support surfaces. The first support surface 71 of the annular element 7 engages progressively the frusto-conical seats 21 of the sectors 2 which, in the usual manner, causes closing of the sectors 2 and thereby of the cavity 5 of the mold 1.

After the closing of the mold, the temperature of the rubber evolves from about 20° C. up to the vulcanization temperature which can be about 160° C. The difference in temperature can therefore reach 140° C. The volume of rubber in the cavity having been determined to correspond essentially to that of the cavity, the expansion of the volume of rubber will cause a progressive increase of the internal pressure in the cavity 5 of the mold 1. This increase will cause a corresponding increase of the forces of radial extension on the sectors 2 and thus of the forces of circumferential extension on the crown 6 through the annular element 7. Beyond a given threshold of pressure, since the engagement between the second support surface 72 of the annular element 7 and the corresponding surface 62 of the crown 6 is not wedging, when the force of closing F applied on the crown 6 as well as the forces of friction between the second support surface 72 and the corresponding surface 62 of the crown 6 have been surmounted, an axial displacement of retraction of the crown 6 will occur. This axial displacement of retraction of the crown 6 will eliminate the support between the third support surface 73 of the annular element 7 and the corresponding surface 63 of the crown 6 and allow a circumferential extension of the annular element 7 as well as a radial retraction of the sectors 2.

As soon as the first axial retraction of the crown 6 occurs, the forces of bracing due to this crown 6 against the second support surface 72 of the annular element 7 do not increase any more and remain essentially constant at a level which is a function of the force F applied on the crown 6. Consequently, only the stiffness in circumferential extension of the annular element 7 opposes any new increase of internal pressure in the cavity 5. Previously, the stiffnesses in circumferential extension of the annular element 7 and of the crown 6 combined to oppose any radial retraction of the sectors 2 and since the stiffness in circumferential extension of the crown 6 is very high, we could say that any radial retraction of the sectors 2 was impossible. On the other hand, after axial retraction of the crown 6, any further expansion of the rubber in the cavity 5 will only cause a slight increase of internal pressure because of the increase of the volume of the cavity due to the retraction of the sectors 2.

The stiffness in circumferential extension of the annular element 7 is chosen such that, combined with the usual levels of forces of closing F, the increase in internal pressure in the mold 1 can be limited to admissible values.

The value of the threshold of internal pressure in the cavity 5 from which the axial retraction of the crown 6 is done is adjustable by controlling the value of the axial force F applied on the crown 6.

When the molding and vulcanization of the annular tread member is completed, the cavity of the mold is opened by retracting the crown 6 axially. This movement will cause the retraction of the annular element 7 owing to the surface 64 of the crown 6 which comes to rest on the surface 74 of the annular element 7. The sectors 2 are also retracted radially by known means, which causes removal of the tread member from the mold.

Figure 2:
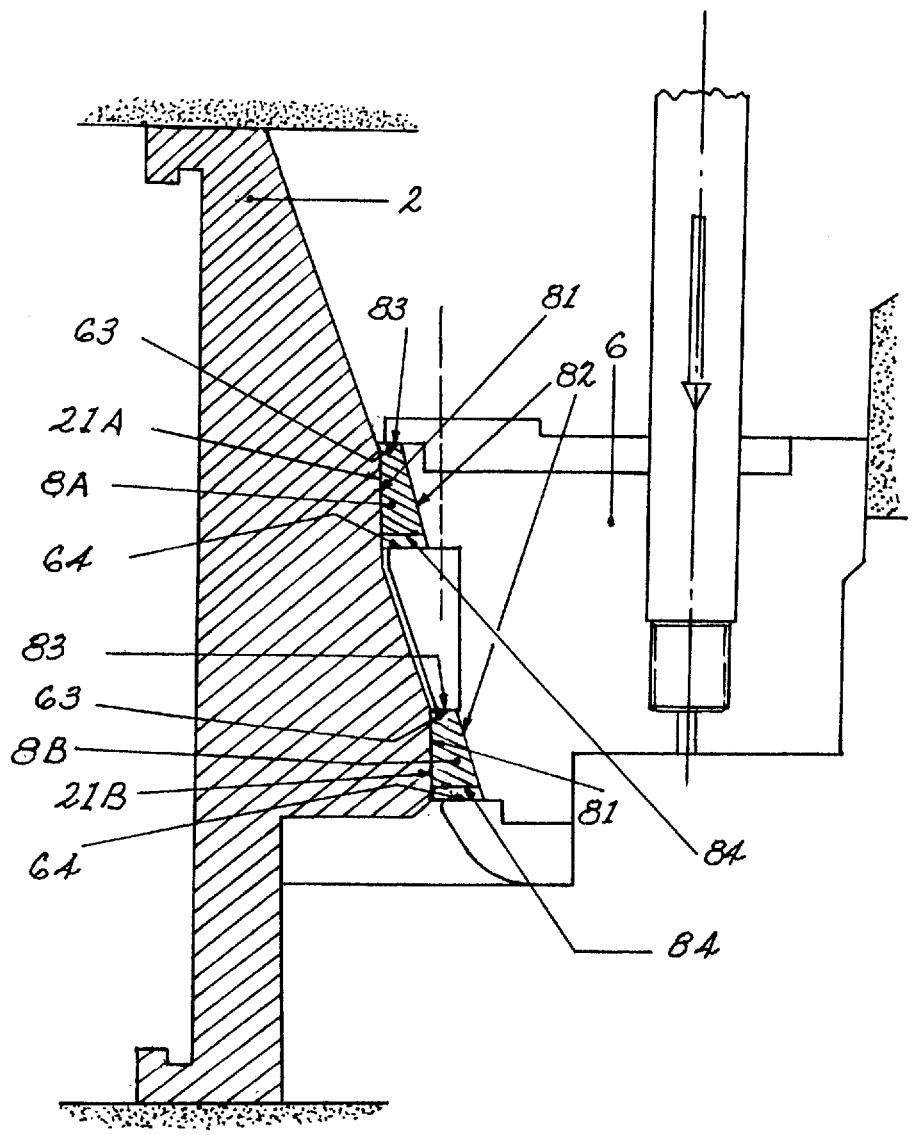
FIG. 2 is a detail of FIG. 1 showing a second method of realizing an annular element.

FIG. 2 shows a second mode of realization of the invention in which the sectors 2 are supplied with two frusto-conical seats 21A and 21B axially and radially offset from each other, such that the general shape of the sectors 2 is not modified. The crown 6 is comprised of two housings to receive an annular element 8 comprised of two rings 8A and 8B of cross-sections which are essentially trapezoidal. Engagement with the two frusto-conical seats 21A and 21B of sectors 2 is provided by the first frusto-conical support surfaces 81; support on the crown 6 is provided by the second support surfaces 82 and the third support surfaces 83. Like previously, the angle of inclination of the first support surfaces is such that the fit with the frusto-conical seats of the sectors is wedging, while the fit with the crown 6 is not. At the time of closing of the mold, the annular element 8 is supported on the crown 6 by the surfaces 82 and 83, which practically prohibits any circumferential extension of this annular element 8.

After closing of the mold, as in the previous case, beyond a threshold of internal pressure in the cavity 5 of the mold 1, we will observe an axial retraction of the crown 6 which will eliminate the supports between the third support surfaces 83 of the annular elements 8A and 8B and the corresponding surfaces 63 of the crown 6 and allow circumferential extension of the annular elements 8A and 8B as well as radial retraction of the sectors 2. This permits limiting the values of pressure in the cavity 5 to admissible values.

At the time of retraction of the crown 6, the contact between the surfaces 74 or 84 of the annular element 7 or 8 and the corresponding surfaces 64 or 65 will release the engagement of the annular element with the frusto-conical seats 21 and thus assure retraction of the entire crown 6, allowing radial retraction of the sectors 2.

The surfaces 84 and 64 are separated, when the annular ring 8A or 8B is resting on the surface 63 of the crown 6, by a sufficient distance considering the expected extensions during molding.

The two rings 8A and 8B are preferably positioned on both sides of the plane of symmetry of the mold 1 and have their sections calculated in order to balance the torque of tipping of the sectors 2 at the time of their radial retraction.

We claim:

1. Mold for a tire or for an annular tread member of a tire, comprised of a multiplicity of sectors moving radially for the molding of the exterior of said tread member, the closing of said sectors being assured by the axial displacement of a crown coming to act on the frusto-conical seats of said sectors placed radially on the exterior, and, to permit retraction of the sectors from their position of closing in the mold, at least one annular element, positioned within a recess in said crown, which is comprised of a first support surface, frusto-conical, radially interior, intended to be applied at the time of the closing of the mold against the seats of the sectors with a wedging engagement and a second support surface, frusto-conical, radially exterior, intended to support the support of a corresponding surface of the crown with a non-wedging engagement, said crown resting with a controlled axial force.

2. Mold for a tire or for an annular tread member of a tire according to claim 1, such that the annular element is also comprised of a third support surface intended to fit against a corresponding surface of the crown to block related axial displacements between the annular element and the crown at the time of the closing of the mold.

3. Mold for a tire or for an annular tread member of a tire according to claim 1, such that the second support surface of the annular element and the corresponding support surface of the crown are frusto-conical with an angle of inclination relative to the axis of the mold of about 16 degrees minimum.

4. Mold for a tire or for an annular tread member of a tire according to claim 2, such that the second support surface of the annular element and the corresponding support surface of the crown are frusto-conical with an angle of inclination relative to the axis of the mold of about 16 degrees minimum.

5. Mold for a tire or for an annular tread member of a tire according to claim 1, further comprising a rigid hub such that the molding of the radially interior sole of the tire or of the annular tread member for a tire is done on said rigid hub.

6. Mold for a tire or for an annular tread member of a tire according to claim 2, further comprising a rigid hub such that the molding of the radially interior sole of the tire or of the annular tread member for a tire is done on said rigid hub.

7. Mold for a tire or for an annular tread member of a tire according to claim 3, further comprising a rigid hub such that the molding of the radially interior sole of the tire or of the annular tread member for a tire is done on said rigid hub.

8. Mold for a tire or for an annular tread member of a tire according to claim 4, further comprising a rigid hub such that the molding of the radially interior sole of the tire or of the annular tread member for a tire is done on said rigid hub.

9. Process for manufacturing a tire or a tread member of a tire, comprising: molding the tire in a mold for a tire or for an annular tread member of a tire, comprised of a multiplicity of sectors moving radially for the molding of the exterior of said tread member, the closing of said sectors being assured by the axial displacement of a crown coming to act on the frusto-conical seats of said sectors placed radially on the exterior, and, to permit retraction of the sectors from their position of closing in the mold, at least one annular element, positioned within a recess in said crown, which is comprised of a first support surface, frusto-conical, radially interior, intended to be applied at the time of the closing of the mold against the seats of the sectors with a wedging engagement and a second support surface, frusto-conical, radially exterior, intended to support the support of a corresponding surface of the crown with a non-wedging engagement, said crown resting with a controlled axial force.

10. Process for manufacturing a tire or a tread member of a tire according to claim 9, wherein the annular element is also comprised of a third support surface intended to fit against a corresponding surface of the crown to block related axial displacements between the annular element and the crown at the time of the closing of the mold.

11. Process for manufacturing a tire or a tread member of a tire according to claim 9, wherein the second support surface of the annular element and the corresponding support surface of the crown are frusto-conical with an angle of inclination relative to the axis of the mold of about 16 degrees minimum.

12. Process for manufacturing a tire or a tread member of a tire according to claim 9, wherein the molding of the radially interior sole of the tire or of the annular tread member for a tire is done on a rigid hub.

* * * * *